(12) United States Patent
Mei et al.

(10) Patent No.: US 9,607,228 B2
(45) Date of Patent: Mar. 28, 2017

(54) PARTS BASED OBJECT TRACKING METHOD AND APPARATUS

(71) Applicant: Toyota Motor Engineering & Manufacturing North America, Inc., Erlanger, KY (US)

(72) Inventors: Xue Mei, Ann Arbor, MI (US); Danil Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 498 days.

(21) Appl. No.: 14/180,620

(22) Filed: Feb. 14, 2014

(65) Prior Publication Data

US 2015/0235092 A1   Aug. 20, 2015

(51) Int. Cl.
| | | |
|---|---|---|
| G06K 9/00 | (2006.01) | |
| G06K 9/32 | (2006.01) | |
| G06K 9/62 | (2006.01) | |
| G06T 7/20 | (2017.01) | |

(52) U.S. Cl.
CPC ....... *G06K 9/00805* (2013.01); *G06K 9/3258* (2013.01); *G06K 9/6203* (2013.01); *G06T 7/208* (2013.01); *G06T 7/2033* (2013.01); *G06K 2209/15* (2013.01); *G06T 2207/10016* (2013.01); *G06T 2207/20021* (2013.01); *G06T 2207/20072* (2013.01); *G06T 2207/20081* (2013.01); *G06T 2207/30252* (2013.01)

(58) Field of Classification Search
None
See application file for complete search history.

(56) References Cited

U.S. PATENT DOCUMENTS

| 7,764,808 | B2 | 7/2010 | Zhu et al. | |
|---|---|---|---|---|
| 8,098,889 | B2 | 1/2012 | Zhu et al. | |
| 8,254,670 | B2 | 8/2012 | Prokhorov | |
| 2010/0246980 | A1* | 9/2010 | Tong ................. | G06K 9/00228 382/228 |
| 2011/0255741 | A1* | 10/2011 | Jung ................. | G06K 9/00369 382/103 |
| 2013/0271458 | A1* | 10/2013 | Andriluka ........... | G06K 9/00342 345/420 |
| 2014/0185925 | A1* | 7/2014 | Datta .................. | G06K 9/6256 382/159 |

(Continued)

OTHER PUBLICATIONS

Mei et al., Robust Visual Tracking using l1 Minimization, 2009, pp. 1-8.*

(Continued)

*Primary Examiner* — Jason Heidemann
(74) *Attorney, Agent, or Firm* — Christopher G. Darrow; Darrow Mustafa PC (57) ABSTRACT

The method and apparatus segment parts from a main target image, represent each part as a vertex in a spanning tree, use a detector to generate a confidence map of a location of each part in a succeeding video frame and apply scale change to detector sliding windows centered about each pixel in the part location image. In the succeeding video frame, the target location is sampled and a tracking probability is generated for each part bounding box, with the tracking probability having the maximum value being selected as the location of the target in the succeeding video frame.

19 Claims, 6 Drawing Sheets

(56) References Cited

U.S. PATENT DOCUMENTS

2015/0139485 A1* 5/2015 Bourdev ............ G06K 9/00362
382/103

OTHER PUBLICATIONS

Pan et al., A Hybrid Approach to Detect and Localize Texts in Natural Scene Images, Mar. 2011, IEEE Transactions on Image Processing, vol. 20, No. 3.*
Rout et al., A Survey on Object Detection and Tracking Algorithms, National Institute of Technology Rourkela, India, 2013.*
Parekh et al., A Survey on Object Detection and Tracking Methods, Feb. 2014, IJIRCCE, vol. 2, Issue 2, pp. 2970-2978.*
Joshi et al, A Survey on Moving Object Detection and Tracking in Video Surveillance System, Jul. 2012, IJSCE, vol. 2, Issue 3.*
Wang et al., "Automatic Vehicle Detection Using Local Features—A Statistical Approach", 18th IPPR Conference on Computer Vision, Graphics and Image Processing, Aug. 21-23, 2005, Taipei, ROC.
Nguyen, Chuong Hoang, "Features Identification and Tracking for an Autonomous Ground Vehicle", Thesis for Virginia Polytechnic Institute and State University, Blacksburg, VA, Apr. 30, 2013.
P. Felzenszwalb, R. Girshick, D. McAllester, D. Ramanan. "Object Detection with Discriminatively Trained Part Based Models", IEEE Transactions on Pattern Analysis and Machine Intelligence, 32(9): 1627-1645, 2010.
P. Felzenszwalb and D. Huttenlocher. "Pictorial Structures for Object Recognition", International Journal of Computer Vision, 61(1), 2005.
M. Sun and S. Savarese. "Articulated Part-based Model for Joint Object Detection and Pose Estimation", International Conference in Computer Vision, 2011.
R. Fergus, P. Perona, and A. Zisserman. "Object Class Recognition by Unsupervised Scale-Invariant Learning", IEEE Conference on Computer Vision and Pattern Recognition, 2003.
G. Hua and Y. Wu. "Measurement integration under inconsistency for robust tracking", IEEE Conference on Computer Vision and Pattern Recognition, 2006.
R. Yao, Q. Shi, C. Shen, Y. Zhang, A. Hengel. "Part-based Visual Tracking with Online Latent Structural Learning", IEEE Conference on Computer Vision and Pattern Recognition, 2013.
S. M. N. Shahed, J. Ho, and M.-H. Yang. "Visual tracking with histograms and articulating blocks", IEEE Conference on Computer Vision and Pattern Recognition, 2008.
J. Kwon and K. M. Lee. "Tracking of a non-rigid object via patch-based dynamic appearance modeling and adaptive basin hopping monte carlo sampling", IEEE Conference on Computer Vision and Pattern Recognition, 2009.
A. Adam, E. Rivlin, and I. Shimshoni. "Robust fragments-based tracking using the integral histogram", IEEE Conference on Computer Vision and Pattern Recognition, 2006.

* cited by examiner

PARTS BASED OBJECT TRACKING METHOD AND APPARATUS

BACKGROUND

The present disclosure relates, in general, to vehicle object detection and tracking methods and apparatus and, more specifically, to methods and apparatus for detecting and tracking objects from a moving vehicle.

Vehicle safety is deemed enhanced by computer and sensor based systems which detect objects, such as vehicles, pedestrians, as well as stationary poles and signs which may be in the path of a moving vehicle and could result in a collision.

Autonomous driverless vehicles are also being proposed. Such autonomous vehicles require a current view of surrounding objects, such as vehicles, poles, pedestrians, etc., which may be moving or stationary relative to the moving vehicle.

In order to accurately implement vehicle based collision based warning and avoidance systems as well as to implement autonomous driverless vehicles, object detection and tracking methods have been proposed.

SUMMARY

A method and apparatus for detecting and tracking objects includes receiving a video sequence including a plurality of sequential video frames from a video camera, selecting a target image in a first video frame, segmenting the target image into at least one identifiable part in a target bounding box, and training a detector for each of the at least one part in the first video frame. In a next video frame, the method samples the position of the target bounding box in a particle filter framework. For each part of the at least one part, a confidence map is generated from the search region for the possible location of the part by applying a plurality of sliding windows of polygonally arranged pixels, each sliding window centered around each pixel in the search region for the at least one part located in the first video frame, and generating a tracking score for each sliding window corresponding to a probability of the part being centered in each sliding window in the next video frame.

The segmenting step includes segmenting the target image into a plurality of separate parts, each in a separate part bounding box, and then representing each of the plurality of parts as a vertex in a spanning tree.

The method applies scale change to each sliding window for each part.

The method varies the size of the sliding windows applied to each pixel and repeats the generating step for each sliding window for each scale change.

The method, in the next video frame, updates the confidence map for each part in each sampled target location by multiplying a detector output confidence map for each part by a Gaussian distribution centered at an ideal location of each part in each sampled whole target bounding box.

The method generates the tracking score encoding the appearance similarity between the detected part and the reference part and a deformation factor for each individual part penalized from the ideal location.

The method includes forming the detector using a detection algorithm based on a deep learning network.

The method includes outputting, by the detector, a video frame detection probability of a candidate region pixel by pixel in each of the video frames.

The method defines the search region of at least one part in the next video frame as a rectangular area of a predetermined size centered on the position of the at least one part in the previous video frame.

The method applies the detector with different scale sliding windows on the same video frame image and repeats the generation of a confidence map pixel by pixel for all scales.

The method for each scale applies the detector for the at least one part only to a search region centered on the location of the at least one part from a previous video frame.

The method models the state of the target by motion parameters of position and scale of a rectangular target bounding box.

The method samples the position and scale of the target bounding box in each video frame to obtain an image patch for the target.

The method defines an ideal location of at least one part in each video frame within the whole target image patch.

The method defines a change in a position of the at least one part between two successive video frames as a function measuring a degree of conformity when the part is in a first location and when the part is in a second location.

The method defines the tracking score as:

$$c(x) = \lambda m(x) + \Sigma m_i(t_i) + \Sigma d_{ij}(t_i, t_j)$$

where m(x) is a matching score for the target bounding box and λ is a weighting factor between the target and its parts.

The method generates the detection score by defining the configuration of the parts that maximizes a second term and a third term of the tracking score equation using dynamic programming.

The method generates the tracking result for a sample having a maximum probability by $$p(y_i | x_i) = \frac{1}{\Gamma} \exp\{\alpha c(x_i)\},$$

where Γ is the normalization factor, a is the tuning parameter, and $y_i$ is the observation.

The method removes at least one part from a tracking sequence when a maximum tracking score in the part confidence map for the at least one part is below a threshold.

BRIEF DESCRIPTION OF THE DRAWING

The various features, advantages and other uses of the present part based object tracking method and apparatus will become more apparent by referring to the following detailed description and drawing in which.

DETAILED DESCRIPTION

Referring now to the drawing, and to FIGS. 1-5 in particular, there is depicted a parts based object tracking apparatus useful in implementing a part based object tracking method which will be described hereafter.

Figure 1:
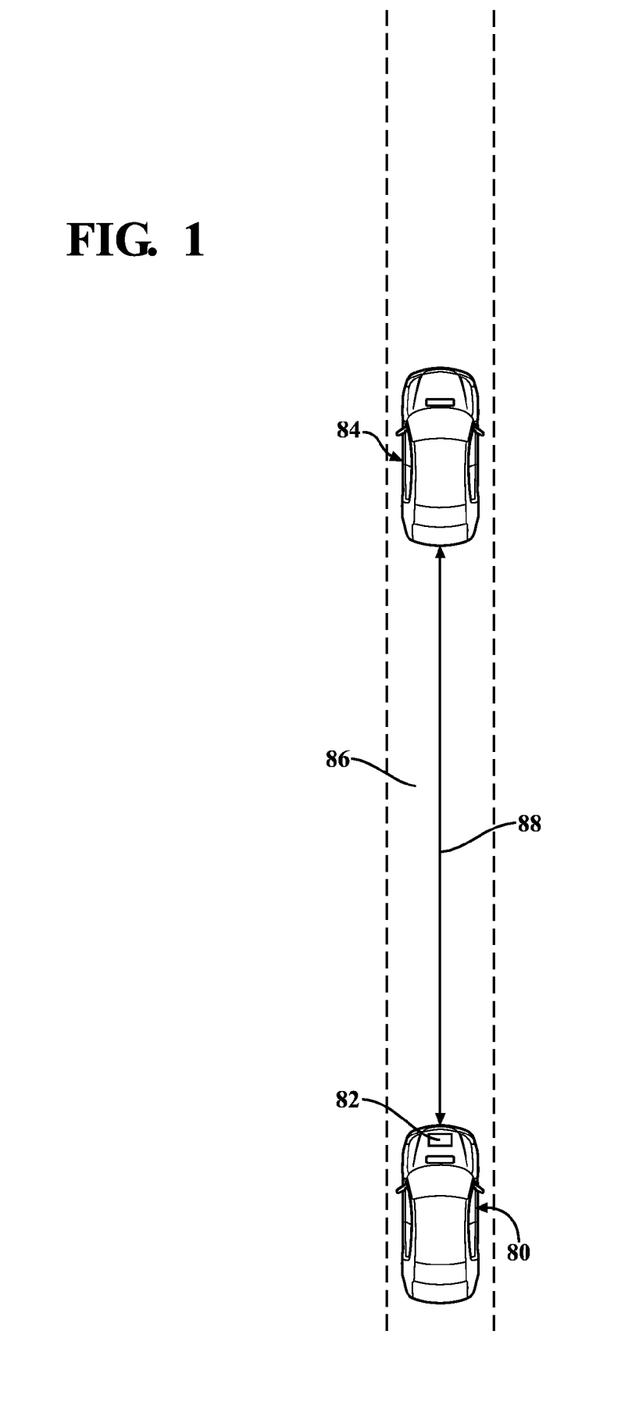
FIG. 1 is a pictorial representation of the present method and apparatus tracking a detected vehicle in the path of the moving vehicle.

The apparatus, which can be mounted on a moving vehicle 80, includes a video camera 82. By way of example, the video camera 82 may be a high definition video camera with a resolution of 1024 pixels per frame.

The video camera 82, in addition to possibly being a high definition video camera 82, for example, can also be a big-picture/macro-view (normal or wide angle) or a telephoto camera. Two types of cameras, one having normal video output and the other providing the big-picture/macro-view normal or wide angle or telephoto output, may be employed on the vehicle 80. This would enable one camera to produce a big-picture/macro view, while the other camera could zoom in on parts of the target.

Figure 2:
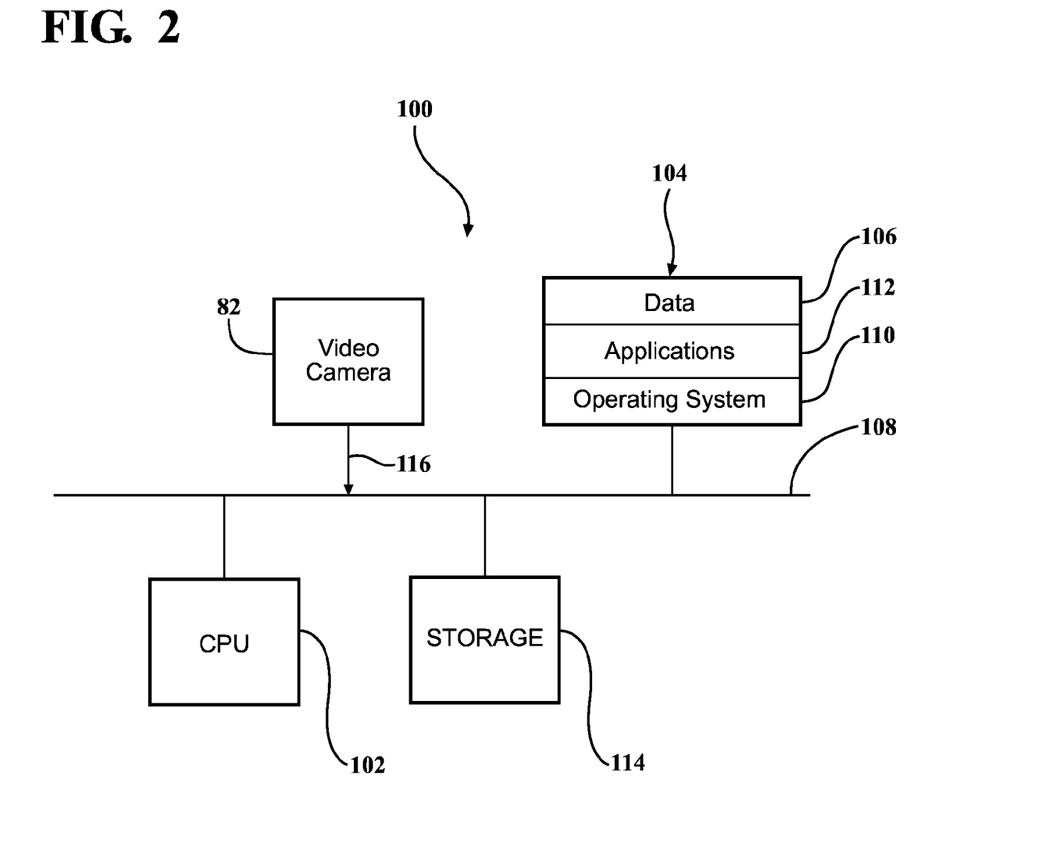
FIG. 2 is a block diagram of a computing device for implementing the disclosed method and forming part of the disclosed apparatus.

The apparatus, using the video camera 82 and the control system described hereafter and shown in FIG. 2, detects objects, such as a detected vehicle 84, on a roadway 86 to the front, side or even, in some applications, the rear of the vehicle 80 within the field of view of the video camera 82 as indicated by arrow 88.

The method is implemented on and the apparatus includes a computing device shown in a block diagram form in FIG. 2. The computing device 100 can be any type of device, including a handheld, desktop, or other form of single computing device, or it can be formed of multiple computing devices. A CPU 102 in the computing device 100 can be a conventional central processing unit or any other type of device, or multiple devices, capable of manipulating or processing information. A memory 104 in the computing device 100 can be a Random Access Memory device (RAM) or any other suitable type of storage device. The 104 can include data 106 that is accessed by the CPU 102 using a bus 108. The memory 104 can also include an operating system 110 and installed applications 112. The installed applications 112 include programs that permit the CPU 102 to perform the map road lane-level generation method described herein.

The computing device 100 can also include secondary, additional, or external storage 114, for example, a memory card, flash drive, or other forms of computer readable medium. The installed applications 112 can be stored in whole or in part in the secondary storage 114 and loaded into the memory 104 as needed for processing.

The computing device 100 receives, as an input, high definition video output 116 from the video camera 82 mounted on the vehicle 80 in the form of sequential video frame image data.

The video frame image data may be stored in the memory 104 and/or the secondary storage 114.

Figure 3:
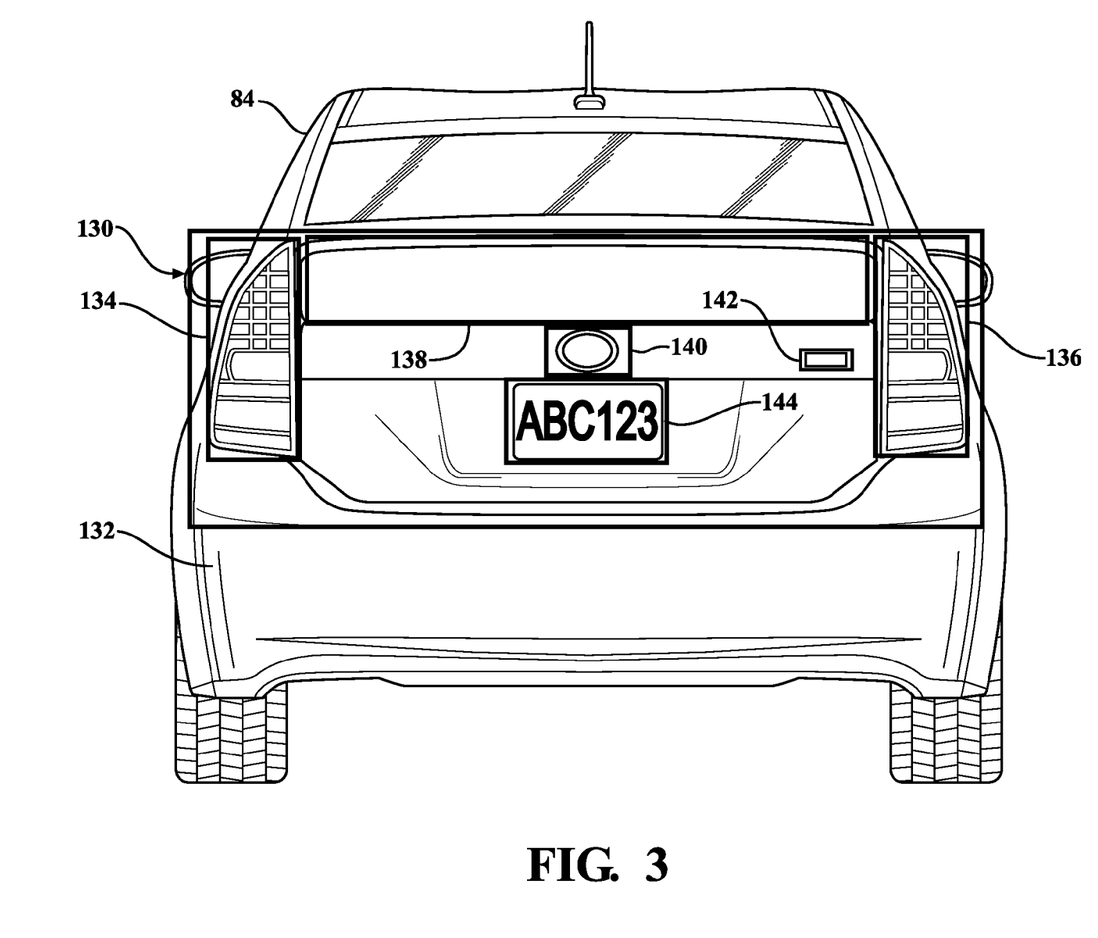
FIG. 3 is a pictorial representation of a target bounding box and multiple part bounding boxes on a detected object.

Using the high definition video output 116 from the video camera 82, a target image 132 will have a reasonable size, as shown in FIG. 3, to enable the segmentation of meaningful parts from the detected vehicle 84 with a reasonable size to implement tracking. For example, if a license plate is segmented as one part and tracked, the license plate can provide a unique identification of the detected vehicle 84 as long as it has enough resolution to be successfully tracked. As another example, many vehicles can be tracked by relying on their unique shapes or styling features, such as front grills, lights, manufacture logos, etc.

The method and apparatus employ a tracking methodology which selects a whole target bounding box 130 on a target, which, as shown in FIG. 3 by example, is the rear end of the detected vehicle 84. The method and apparatus track the target bounding box 130 in subsequent video frames.

The present method and apparatus localize the target in the target bounding box 130 and its individual parts in a particle filter framework.

By way of example, the target bounding box 130 includes a number of smaller part bounding boxes 134, 136, 138, 140, 142 and 144. The number and size of each part bounding box 134-144 can be selected based on the size of the target bounding box 130 and the number of individual discriminable parts which can be successfully segmented and distinguished in the target bounding box 130.

Fast image segmentation is applied to the target image 132 to select the main target bounding box 130. The fast image segmentation also allows selection of the individual part bounding boxes 134-144 within the main target bounding box 130.

Each part bounding box 134-144 is based on a discriminability and suitability check for each part shape and size. Each part bounding box 134-144 is represented by a rectangle, for example, so the individual parts need to be suitable such that each part occupies most of the rectangular region of its part bounding box 134-144 and is easily discriminative from the surrounding portion of the target image 132 in the target bounding box 130.

Figure 4A:
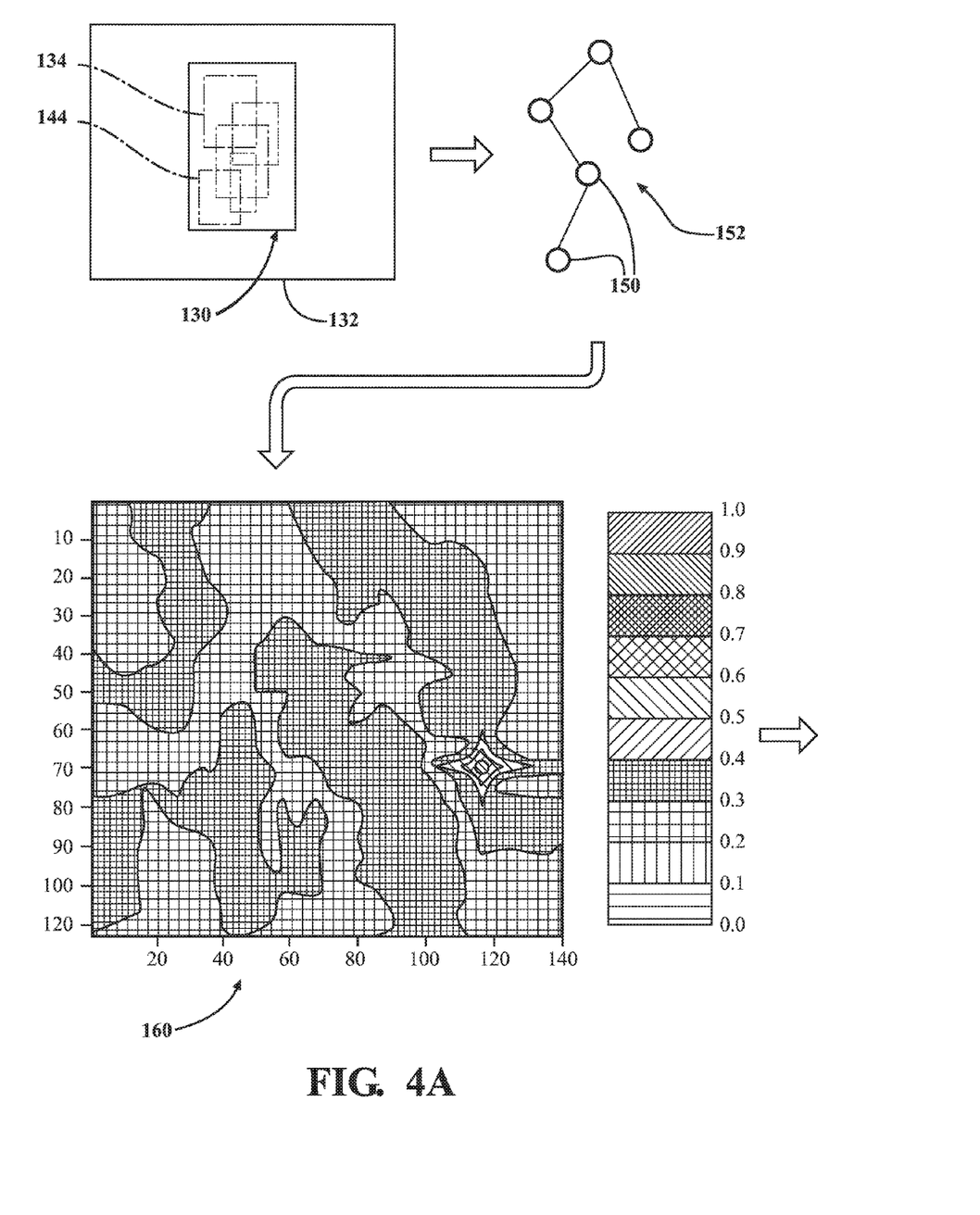
FIGS. 4A and 4B are pictorial representations of the method steps.
Figure 4B:
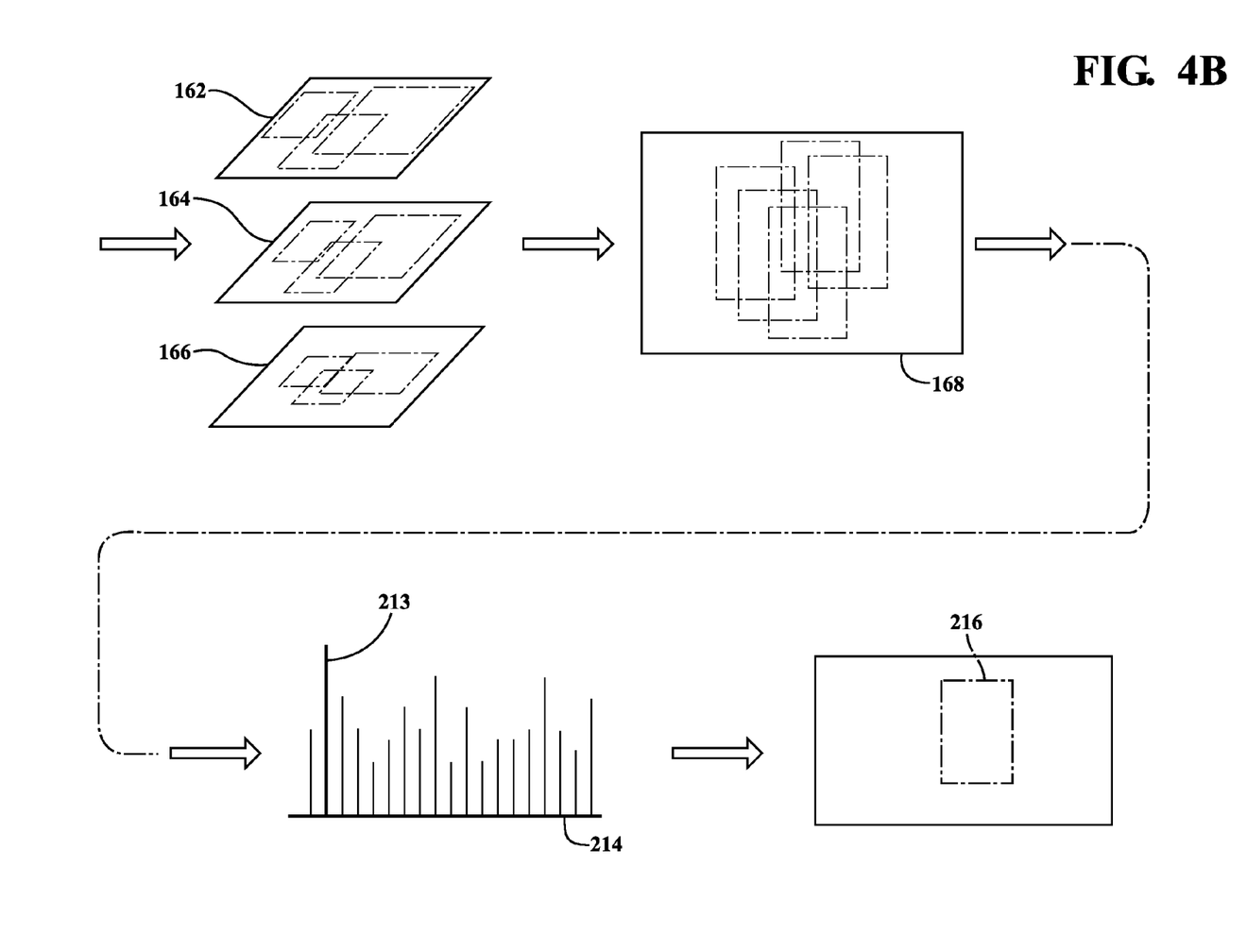
Figure 5:
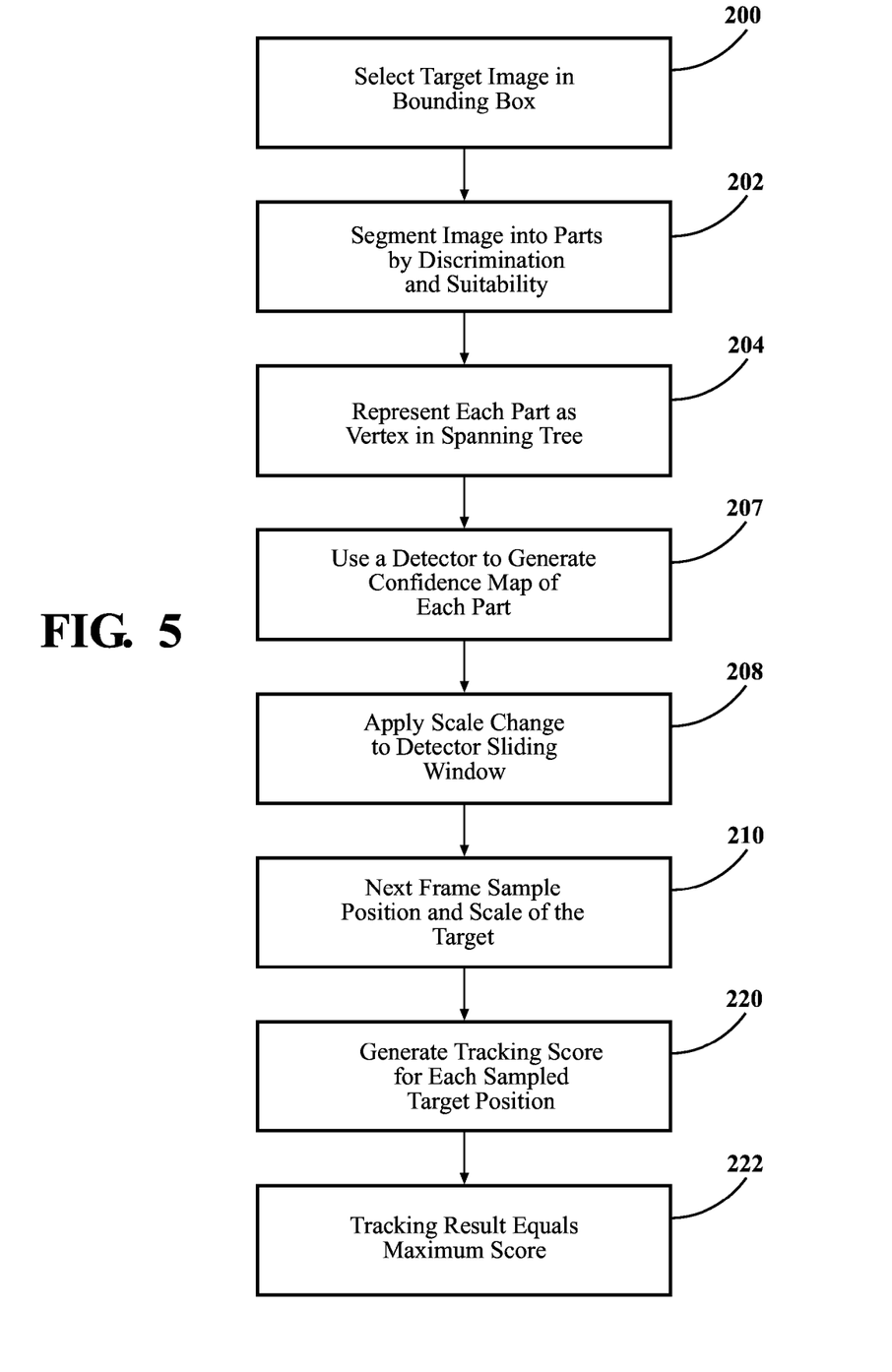
FIG. 5 is a flow diagram depicting the sequence of method steps implemented by the computer apparatus.

The various method steps are shown pictorially in FIGS. 4A and 4B and in the flowchart of FIG. 5.

In step 200, the target image 132, such as that of the rear end of the detected vehicle 84 in FIG. 3, is selected. The CPU 102 then segments the image patch within the target bounding box 130 into individual parts by discrimination and suitability in step 202. This results, as shown in FIG. 4A, with the target bounding box 130 containing a number of the individual, smaller sized part bounding boxes 134-144.

It should be noted that the individual part bounding boxes 134-144 can be overlapped for tracking purposes.

Next, in step 204, each part bounding box 134-144 is represented as a vertex 150 centered within the part bounding box 134-144. A complete graph of the vertices 150 is then built. A weight is associated with each edge of the part bounding boxes 134-144. The weight discloses the similarities of the vertices 150 that are connected by the edge in terms of features, such as color, size, distance, texture, etc. The CPU 102 then generates a spanning tree, such as a minimum spanning tree (MST) 152, from the graph to connect the vertices 150.

The CPU 102 then generates a detector for each part in step 207 using a suitable detection algorithm, for example, an algorithm based on a deep learning network. The deep learning network is composed of multiple layers of hidden units, and the input to the network is raw or normalized pixel intensities of the target image 132 patch or the features extracted from target image 132 patch, such as color, texture, etc. Although the deep learning network may develop rotational invariance through training on image patches, it may also be useful to use rotational invariance features as additional inputs to the network.

The individual part detectors output a detection probability of the candidate region.

In the next video frame, each part detector is applied to the search region of the respective part using a sliding window operation. The search region for each part is defined as the rectangular area with a certain size that is centered on the position of the part from the previous video frame. Each pixel in a confidence map output by the part detector of the search region for each part is the output of the matching probability of the sliding window centered on that pixel. The sliding window is generated for each pixel and the confidence map generates an output equivalent to the probability of the part being centered in that pixel. This is repeated for all of the pixels in a video frame for each part.

To handle a scale change of the target, the part detector applies a different size of the sliding scale windows from the same image in step 208. Scale change is necessary since the detected object, such as the detected vehicle 84, may be closer or further away from the vehicle 80 carrying the video camera 82 in two successive video frames.

Steps 204 and 207 are then repeated for each scale. For K different scales, K, confidence maps 162, 164, 166 at each different scale are generated for each part in step 210 and as shown pictorially in FIG. 4B.

The state of the target is modeled by the motion parameters position ((u,w) in the image) and scale (s) of the rectangular target bounding box 130. In the next frame, the position and scale (scale affixed to K scales) of the target is sampled to obtain an image patch for each sample. Given the position of the whole image patch 168 in FIG. 4B, the ideal location for each part is $t_i$. The confidence map 160 shown in FIG. 4A is then multiplied by a Gaussian distribution centered on the ideal location 213 of the part in each sampled target location, as shown by the graph 214 in FIG. 4B, to generate a tracking score $m(t_i)$. The detection scoring encodes the appearance similarity between the detected part and the template part and the deformation cost for each individual part penalized from the ideal location.

A function $d(t_i,t_j)$ measures the degree of conformity of the model for the part $v_i$ is placed at location $t_i$ and part $v_j$ is placed at location $t_j$. The tracking score for each sample is:

$$c(x)=\lambda m(x)+\Sigma m_i(t_i)+\Sigma d_{ij}(t_i,t_j)$$

where m(x) is the tracking score for the whole target bounding box 130 and λ is the weighting factor between the whole target bounding box 130 and the parts. For each sample, the target location is given so m(x) is fixed. The problem is then reduced to find the configuration of the parts that maximizes the second and third terms of the equation. The best configuration for the tree structured part model can then be solved efficiently using dynamic programming in step 220.

In the particle filter framework, the likelihood $p(y_i|x_i)$ for particle sample $x_i$ is defined as $$p(y_i|x_i) = \frac{1}{\Gamma}\exp\{\alpha c(x_i)\},$$

where Γ is the normalization factor, α is the tooling parameter and $y_i$ is the observation. The tracking result is the sample 216, FIG. 4B, that has the maximum probability as generated in step 222.

In part based tracking, parts may be occluded from video frame to video frame due to the part being blocked by another object, background distraction, etc. The present method effectively handles occlusions by removing any of the parts from consideration in a particular video frame if the maximum tracking score in the part confidence map is too small or below a threshold which is indicative of being caused by at least a partial occlusion.

The method and apparatus updates the parts location relative to the target box 130 if no parts are occluded and the matching score c(x) is above a predetermined threshold.

What is claimed is:

1. A method for detecting and tracking objects comprising:
   receiving a video sequence including a plurality of sequential video frames from a video camera;
   selecting a target image in a target bounding box in a first video frame;
   segmenting the target image into a plurality of parts each contained in a separate part bounding box;
   training a detector for each of the plurality of parts in the first video frame;
   in a next video frame, sampling the position of a target bounding box in a particle filter framework;
   for each of the plurality of parts, generating a confidence map from a search region for a possible location of the part by applying a plurality of sliding windows of polygonally arranged pixels, each sliding window centered around a pixel in the search region for the part in the first video frame; and
   generating a tracking score for each sliding window corresponding to a probability of the part being centered in each sliding window in the next video frame.

2. The method of claim 1 further comprising:
   representing each of the plurality of parts as a vertex in a spanning tree.

3. The method of claim 1 further comprising:
   applying scale change to each of the plurality of sliding windows.

4. The method of claim 3 further comprising:
   varying a size of each of the plurality of sliding windows and repeating the generating step for each sliding window in each scale change.

5. The method of claim 1 further comprising:
   in the next video frame, for each of the plurality of parts, updating the confidence map for the part in each sampled target location by multiplying a detector output confidence map for the part by a Gaussian distribution centered at an ideal location of the part in each sampled target location.

6. The method of claim 5 further comprising:
   generating a detection score encoding an appearance similarity between the detected part and a reference part and a deformation factor for each individual part penalized from the ideal location.

7. The method of claim 1 further comprising:
   forming the detector using a detection algorithm based on a deep learning network.

8. The method of claim 1 further comprising:
   outputting, by the detector, a video frame tracking probability of a candidate region pixel by pixel in each of the video frames.

9. The method of claim 1 further comprising:
   defining a search region of at least one part in a next video frame as a rectangular area of a predetermined size centered on the position of the at least one part in a previous video frame.

10. The method of claim 1 further comprising:
    applying the detector for at least one part with different scale sliding windows on the same video frame image and repeating the generation of the confidence map pixel by pixel for all scales.

11. The method of claim 10 further comprising:
    for each scale, applying the detector for at least one part only to a search region centered on the location of the at least one part from a previous video frame.

12. The method of claim 11 further comprising:
    modeling a state of the target by motion parameters of position and scale of a rectangular bounding box.

13. The method of claim 12 further comprising:
    sampling the position and scale of the target bounding box in each video frame to obtain an image patch for the target.

14. The method of claim 13 further comprising:
defining an ideal location of the at least one part in each video frame within a whole target image patch.

15. The method of claim 1 further comprising:
defining a change in a position of at least one part between two successive video frames as a function measuring a degree of conformity when the part is in a first location and when the part is in a second location.

16. The method of claim 1 further comprising:
defining a tracking score for the target bounding box as the equation:
$c(x) = \lambda m(x) + \Sigma m_i(t_i) + \Sigma d_{ij}(t_i, t_j)$ where $m(x)$ is the tracking score for the target bounding box, $\lambda$ is a weighting factor between the target bounding box and the part, $m_i(t_i)$ is a detection score, and $d_{ij}(t_i, t_j)$ measures a degree of conformity for parts placed at locations $t_i$ and $t_j$.

17. The method of claim 16 further comprising:
generating the tracking score for the target bounding box by defining a configuration of the plurality of parts that maximizes the second term and the third term of the tracking score equation using dynamic programming.

18. The method of claim 17 further comprising:
generating a tracking result for a sample having a maximum probability by $p(y_i|x_i) = 1/\Gamma \exp\{\alpha c(x_i)\}$, where $\Gamma$ is a normalization factor, $\alpha$ is a tuning parameter, and $y_i$ is an observation.

19. The method of claim 1 further comprising:
removing at least one part from a tracking sequence when a maximum tracking score in a part confidence map for the at least one part is below a threshold.

* * * * *

UNITED STATES PATENT AND TRADEMARK OFFICE
CERTIFICATE OF CORRECTION

PATENT NO. : 9,607,228 B2
APPLICATION NO. : 14/180620
DATED : March 28, 2017
INVENTOR(S) : Mei et al.

Page 1 of 1

It is certified that error appears in the above-identified patent and that said Letters Patent is hereby corrected as shown below:

In the Specification

Column 2, Line 39, replace: "factor, a" with -- factor, α --
Column 3, Line 24, replace: "device shown" with -- device 100 shown --
Column 3, Line 25, replace: "type of device" with -- type of computing device --
Column 3, Line 34, replace: "The 104" with -- The memory 104 --
Column 4, Line 49, replace: "network is raw" with -- the network is the raw --
Column 4, Line 51, replace: "from target" with -- from the target --
Column 5, Line 61, replace: "target box" with -- target bounding box --

In the Claims

Column 7, Line 25, replace: "$p(y_i|x_i)=1/\Gamma\exp\{\alpha c(x_i)\}$" with -- $p(y_i|x_i) = \frac{1}{\Gamma}\exp\{\alpha c(x_i)\}$ --

Signed and Sealed this
Seventh Day of November, 2017

Joseph Matal
*Performing the Functions and Duties of the
Under Secretary of Commerce for Intellectual Property and
Director of the United States Patent and Trademark Office*